(12) United States Patent
Pichetti et al.

(10) Patent No.: US 9,122,843 B2
(45) Date of Patent: Sep. 1, 2015

(54) SOFTWARE LICENSE RECONCILIATION FACILITY

(75) Inventors: Luigi Pichetti, Rome (IT); Carlo Romano, Rome (IT); Marco Secchi, Rome (IT); Antonio Secomandi, Milan (IT)

(73) Assignee: International Business Machines Corporation, Armonk, NY (US)

( * ) Notice: Subject to any disclaimer, the term of this patent is extended or adjusted under 35 U.S.C. 154(b) by 1411 days.

(21) Appl. No.: 12/263,785

(22) Filed: Nov. 3, 2008

(65) Prior Publication Data

US 2009/0158438 A1 Jun. 18, 2009

(30) Foreign Application Priority Data

Dec. 12, 2007 (EP) .................................... 07123057

(51) Int. Cl.
  *G06Q 99/00* (2006.01)
  *G06F 21/10* (2013.01)
  *G06Q 10/00* (2012.01)

(52) U.S. Cl.
  CPC ................ *G06F 21/10* (2013.01); *G06Q 10/00* (2013.04); *G06Q 2220/18* (2013.01)

(58) Field of Classification Search
  CPC ..... G06F 21/00; G06Q 10/00; G06Q 2220/18
  USPC .............................................. 705/50, 51, 59
  See application file for complete search history.

(56) References Cited

U.S. PATENT DOCUMENTS

| | | | |
|---|---|---|---|
| 5,671,412 A | 9/1997 | Christiano | |
| 5,892,900 A * | 4/1999 | Ginter et al. | 726/26 |
| 6,735,701 B1 * | 5/2004 | Jacobson | 726/1 |
| 6,920,567 B1 | 7/2005 | Doherty et al. | |
| 7,155,414 B2 * | 12/2006 | Barritz et al. | 705/59 |
| 7,734,550 B1 * | 6/2010 | Bennett et al. | 705/59 |
| 7,797,678 B2 * | 9/2010 | Moulckers et al. | 717/121 |
| 8,230,515 B1 * | 7/2012 | Brewton et al. | 726/27 |
| 2002/0116627 A1 * | 8/2002 | Tarbotton et al. | 713/200 |
| 2004/0039916 A1 * | 2/2004 | Aldis et al. | 713/177 |
| 2006/0059061 A1 * | 3/2006 | Oey | 705/35 |
| 2006/0190408 A1 * | 8/2006 | Cook et al. | 705/59 |
| 2008/0133289 A1 * | 6/2008 | Armour et al. | 705/7 |
| 2008/0141378 A1 * | 6/2008 | McLean | 726/26 |
| 2008/0148253 A1 * | 6/2008 | Badwe et al. | 717/174 |
| 2008/0183591 A1 * | 7/2008 | Olsson et al. | 705/26 |
| 2008/0234047 A1 * | 9/2008 | Nguyen | 463/42 |
| 2008/0243699 A1 * | 10/2008 | Hilerio et al. | 705/59 |
| 2008/0312943 A1 * | 12/2008 | Zunke et al. | 705/1 |

* cited by examiner

*Primary Examiner* — James D Nigh
(74) *Attorney, Agent, or Firm* — Nelson and Nelson; Daniel P. Nelson; Alexis V. Nelson

(57) ABSTRACT

A method is presented for monitoring software product usage in a data processing system. The method may include installing an instance of a software product on a target entity of a data processing system. A usage condition applicable to the instance may be identified. Reconciliation information may be generated upon installation of the instance. This reconciliation information may correlate the usage condition with the instance to facilitate later determining compliance of the software product with applicable usage conditions.

15 Claims, 8 Drawing Sheets

SOFTWARE LICENSE RECONCILIATION FACILITY

BACKGROUND

Monitoring the usage of software products in a data processing system is often critical to system management. For example, a license management application may be used to verify compliance of software products installed on the system with licenses that have been acquired for their usage. Such licenses may, for example, specify a maximum number of instances of each software product that may be installed.

License management applications generally leverage an inventory tool that may be utilized to discover all instances of software products installed on the system (e.g., by means of unique signatures identifying the software products to be monitored). In this way, the number of instances of each software product may be compared with the number of available licenses to detect any discrepancy, such as for accounting or auditing purposes. Examples of a commercial license management application and a commercial inventory tool are the IBM Tivoli License Compliance Manager ("ITLCM") and the IBM Tivoli Common Inventory Technology ("CIT").

Typically, a software product is delivered in a standard stand-alone mode with a complete license. However, the software product may also be delivered in a bundle mode within one or more software bundles for use with other software products. In this case, no individual license is generally required for the software product since it is already included in a global license for the software bundle. Such is the case with middleware programs, which provide specific services in complex software applications. The same software product may also be delivered again stand-alone, but with a special license, such as in a trial mode for a limited period of time.

SUMMARY OF THE INVENTION

Embodiments of the invention have been developed to facilitate software license monitoring by assigning usage conditions to instances of software products upon installation.

More specifically, one embodiment of the invention includes a method for monitoring software product usage in a data processing system. The method may include installing an instance of a software product on a target entity of a data processing system. A usage condition applicable to the instance may be identified. Reconciliation information may be generated upon installation of the instance. This reconciliation information may correlate the usage condition with the instance to facilitate later determining compliance of the software product with applicable usage conditions.

A corresponding computer program product and system are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

It will be readily understood that the components of embodiments of the present invention, as generally described and illustrated in the Figures herein, may be arranged and designed in a wide variety of different configurations. Thus, the following more detailed description of the embodiments of the systems and methods of the present invention, as represented in the Figures, is not intended to limit the scope of the disclosure, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that embodiments of the invention can be practiced without one or more of the specific details, or with other methods, components, etc. In other instances, well-known structures, or operations are not shown or described in detail to avoid obscuring aspects of the disclosure.

The illustrated embodiments of the invention will be best understood by reference to the drawings, wherein like parts are designated by like numerals throughout. The following description is intended only by way of example, and simply illustrates certain selected embodiments of the invention that are consistent with the disclosure as claimed herein.

Figure 1:
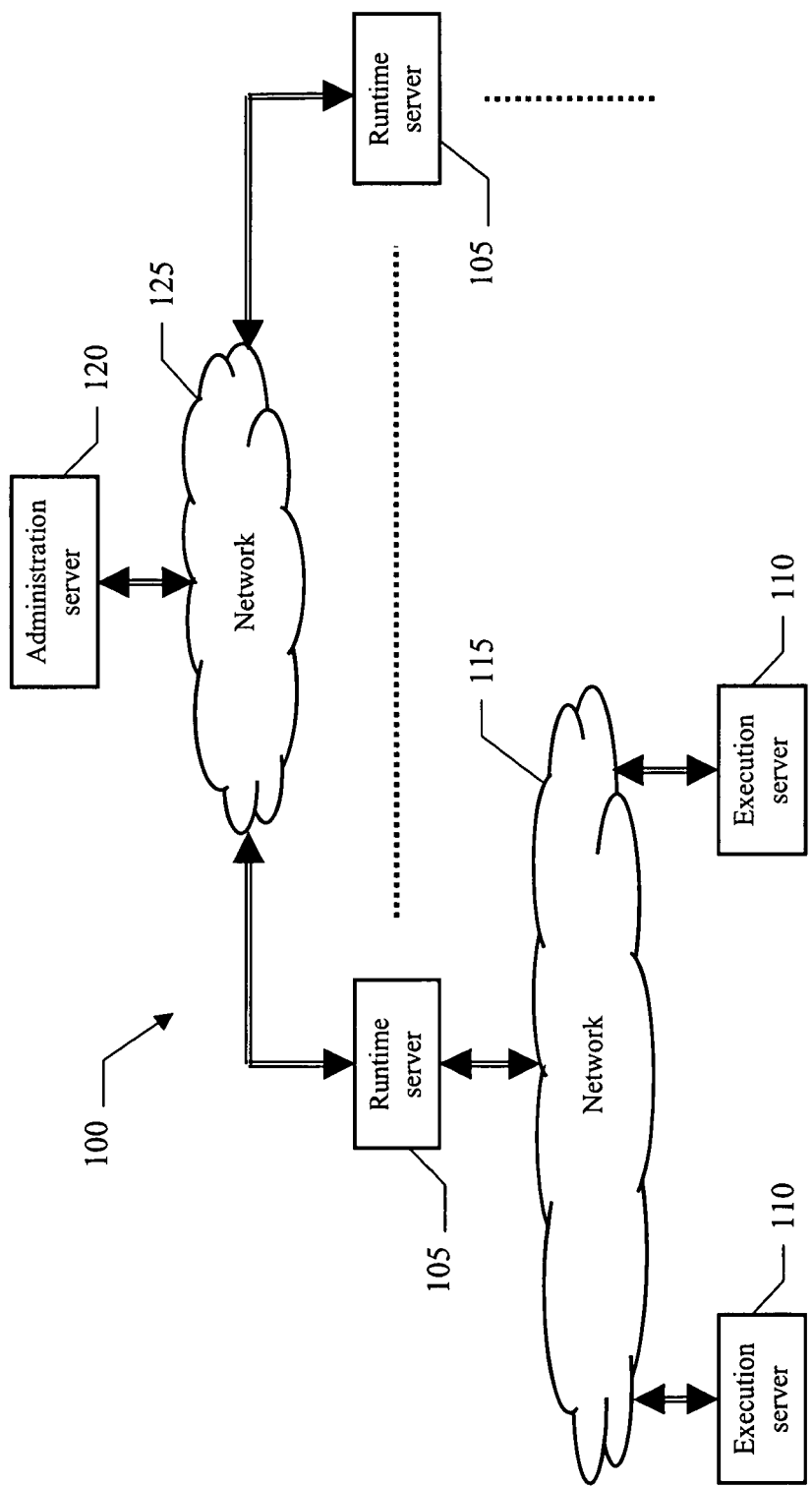
FIG. 1 depicts a data processing system that may be used to practice embodiments of the invention.

With reference now to FIG. 1, a data processing system 100 with distributed architecture is illustrated. The system 100 may implement a license management infrastructure, such as IBM Tivoli License Compliance Manager ("ITLCM"), which may be used to monitor the usage of selected software products.

The system 100 may include one or more independent organizations which may be completely separate and distinct from each other. Within the organization, different divisions may be defined. Each division may be controlled by a runtime server 105, which collects information about the usage, such as installation, of assigned software products on a set of corresponding execution servers 110. For this purpose, the runtime server 105 and all the execution servers 110 of the division may communicate through a network 115, for example, a LAN. The different runtime servers 105 may report to a single administration server 120, which may provide a central control point for the organization. The runtime servers 105 and the administration server 120 may be connected to a different network 125 (for example, a Virtual Private Network ("VPN") based on the Internet).

Figure 2:
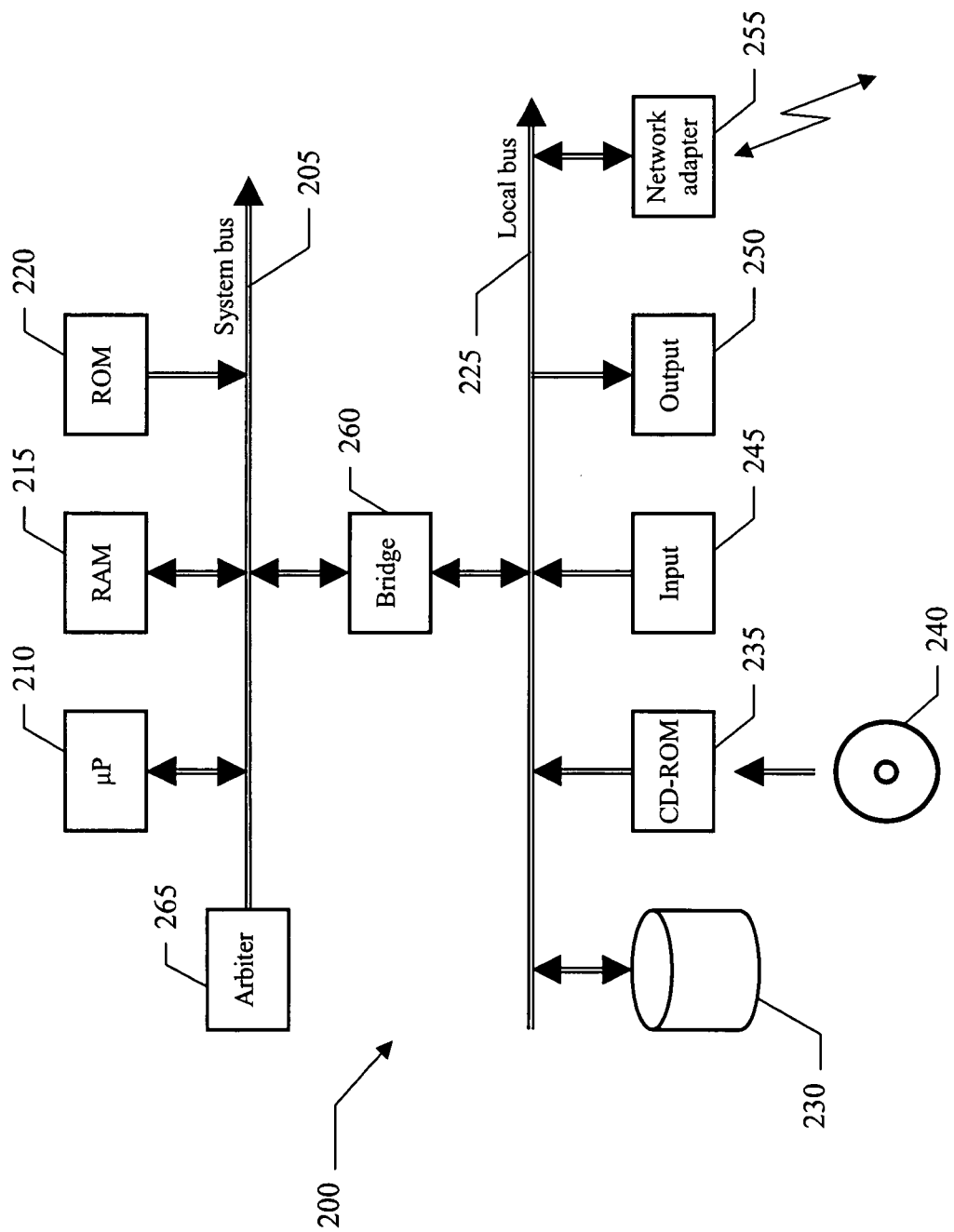
FIG. 2 is a block diagram of a generic computer of embodiments of the system.

Referring now to FIG. 2, a generic computer of the above-described system, including a runtime server, execution server and administration server, is denoted with 200. The computer 200 may be formed by several units that are connected in parallel to a system bus 205, with a structure that is suitably scaled according to the actual function of the computer 200 in the system. In detail, one or more microprocessors 210 may control operation of the computer 200. A RAM 215 may be directly used as a working memory by the microprocessors 210, and a ROM 220 may store basic code for a bootstrap of the computer 200. Several peripheral units may be clustered around a local bus 225 by means of respective interfaces.

A mass memory may consist of one or more hard disks 230 and drives 235 for reading DVD or CD-ROMs 240. The computer 200 may also include input units 245, for example, a keyboard and a mouse, and output units 250, for example, a monitor and a printer. An adapter 255 may be used to plug the computer into the system. A bridge unit 260 may interface the system bus 205 with the local bus 225. Each microprocessor 210 and the bridge unit 260 may operate as master agents requesting access to the system bus 205 to transmit information. An arbiter 265 may manage granting access with mutual exclusion to the system bus 205.

Figure 3:
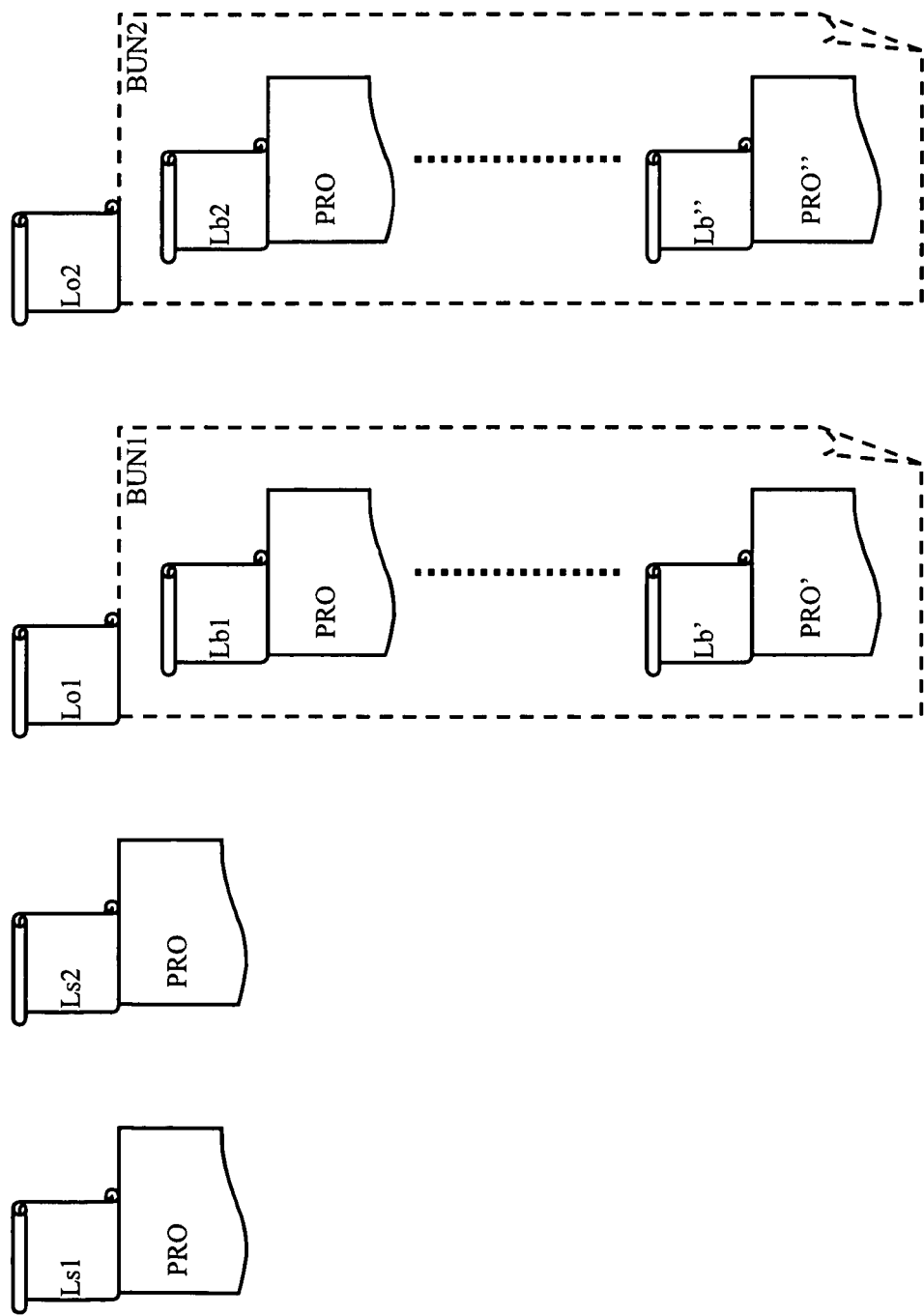
FIGS. 3-5 illustrate exemplary scenarios of application of embodiments of the invention.

As shown in FIG. 3, a generic software product to be monitored (denoted with "PRO") may be delivered with licenses of different types. Each type of licenses may define a specific license condition of the software product, under which usage of the software product may be authorized once a corresponding valid license has been properly acquired.

For example, the software product "PRO" may be delivered under a license condition "Ls1" in a standard stand-alone mode, enabling usage of its full functionality. The software product "PRO" may also be delivered under a license condition "Ls2" in a trial stand-alone mode, allowing free usage for a limited period of time.

In addition, the same software product "PRO" may be delivered under a license condition "Lb1" in a first bundle mode (within a software bundle "BUN1"), to which a corresponding license condition "Lo1" may apply, together with other software products ("PRO") under corresponding license conditions ("Lb"). The software product "PRO" may also be delivered under a license condition "Lb2" in a second bundle mode (within a software bundle "BUN2") to which a corresponding license condition "Lo2" may apply, together with other software products ("PRO") under corresponding license conditions ("Lb"). The license condition "Lb1," for example, may allow free usage of the software product "PRO" in the context of the software bundle "BUN1." The license condition "Lb2," on the other hand, may allow limited usage of the software product "PRO" only on the same execution server on which the software bundle "BUN2" is installed. Typical examples of this software product include discovery tools, Database Management Systems ("DBMS"), and J2EE containers, which may be embedded in license management applications, software distribution applications, monitoring applications, and the like.

Figure 4:
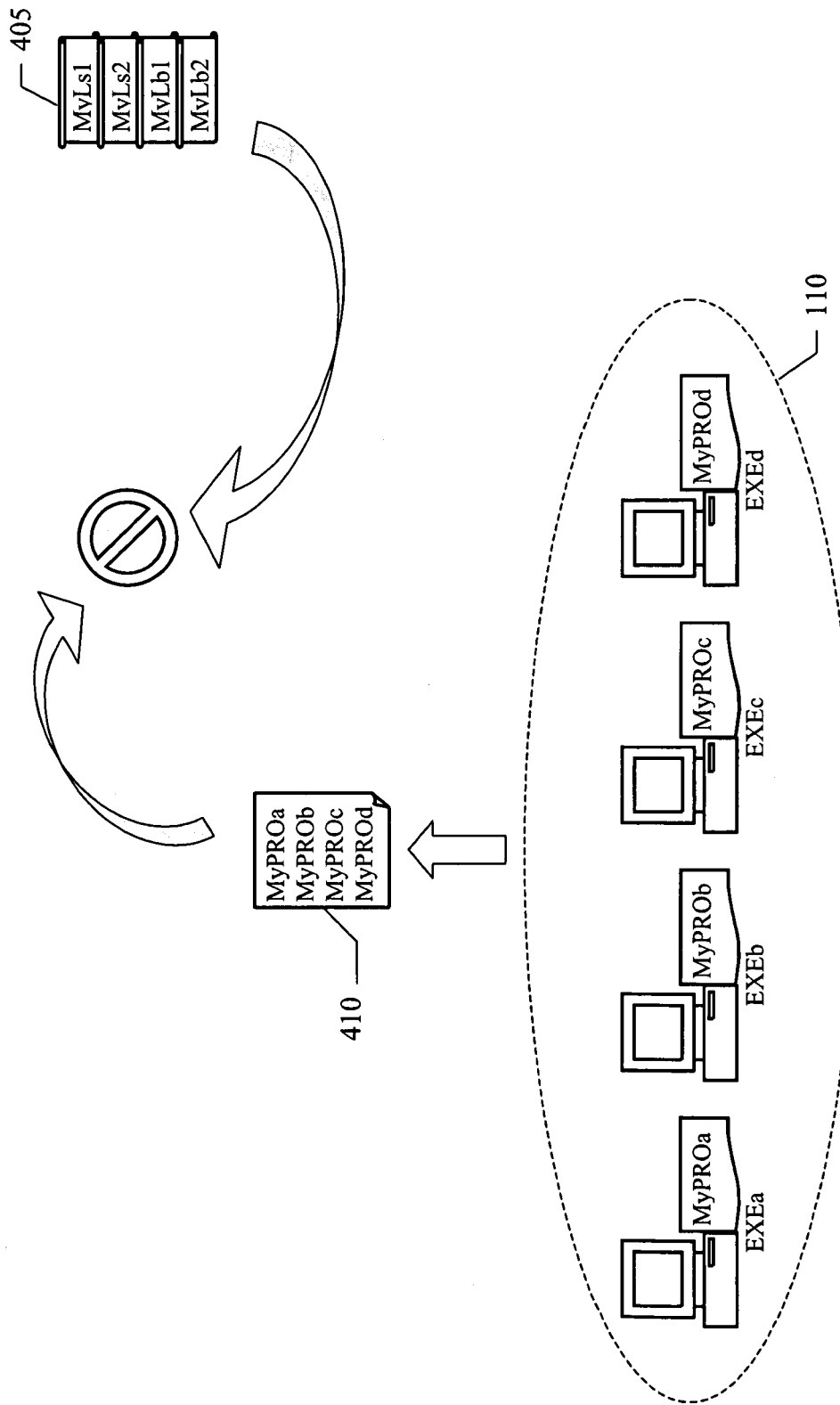

Considering now FIG. 4, different instances of the software product "PRO" may be installed on the execution servers 110. In one embodiment, for example, the software product "PRO" may be installed under the license condition "Ls1" (standard mode) on an execution server EXEa (instance "MyPROa"), and under the license condition "Ls2" (trial mode) on an execution server EXEb (instance "MyPROb"). The software product "PRO" may also be installed under the license condition "Lb1" (first bundle mode) on an execution server EXEc (instance "MyPROc"), and under the license condition "Lb2" (second bundle mode) on an execution server EXEd (instance "MyPROd"), together with other software products of the respective software bundles (not shown).

The licenses that have been acquired for the software product "PRO" 405 may be available on the runtime server (not shown). For example, a license "MyLs1" (of the type "Ls1"), a license "MyLs2" (of the type "Ls2"), a license "MyLb1" (of the type "Lb1"), and a license "MyLb2" (of the type "Lb2") may have been acquired for the instances "MyPROa," "MyPROb," "MyPROc," and "MyPROd," respectively.

To verify compliance of the system with the available licenses 405, all instances of the software products installed on the execution servers 110 may be discovered. In the present example, four instances of the software product "PRO" (i.e., "MyPROa," "MyPROb," "MyPROc," and "MyPROd") may be discovered. In this situation, however, comparison of the discovered information 410 with the available licenses 405 may not provide meaningful results, as indicated by the stop icon in the figure. Indeed, the instances "MyPROa," "MyPROb," "MyPROc," and "MyPROd" might have been installed under the license conditions "Ls1," "Ls2," Lb1," and "Lb2," respectively, so that the system would be in compliance with the available licenses 405. Two or more of the same instances, however, might also have been installed under the license condition "Ls1," such that the system would not be in compliance.

Figure 5:
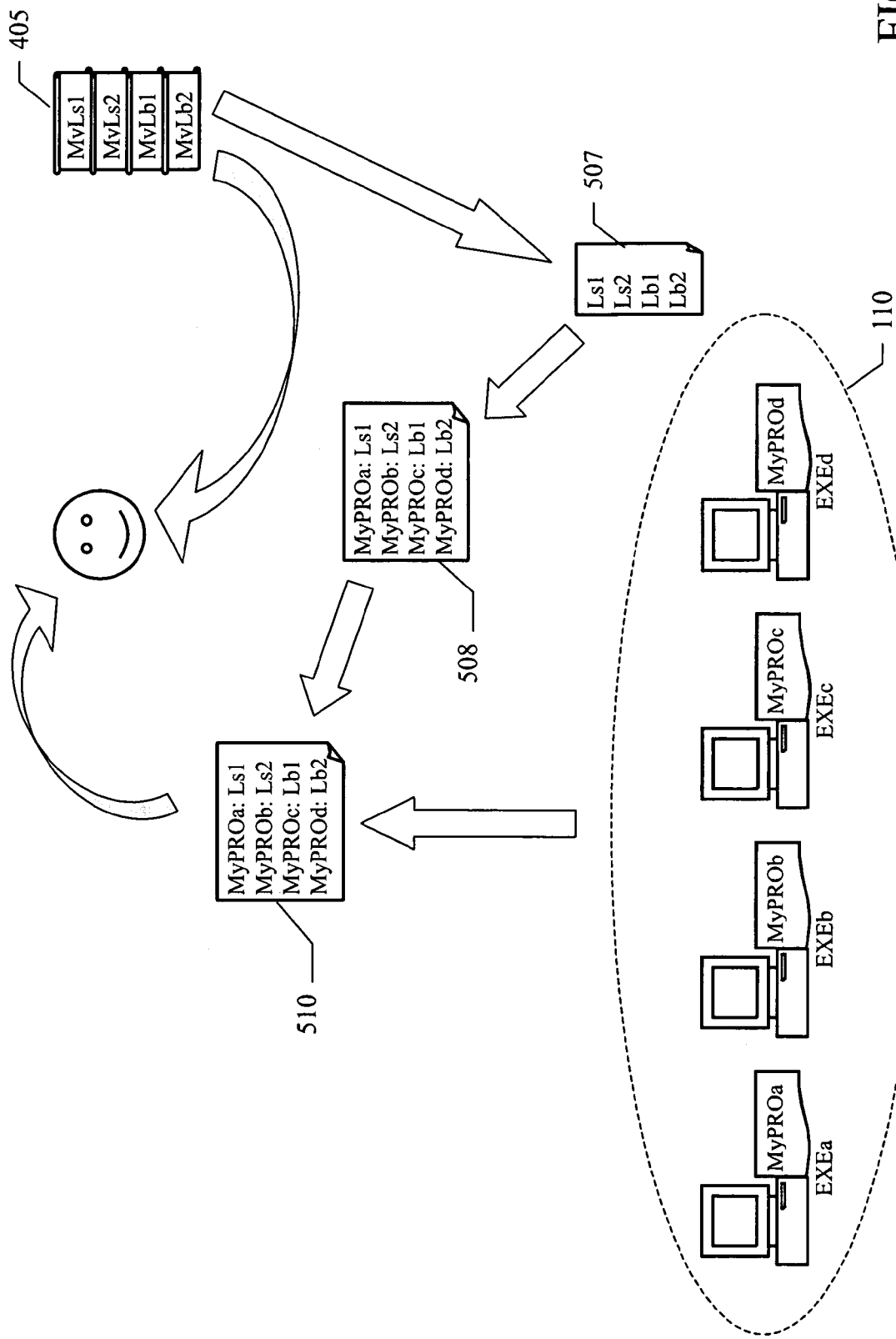

Moving now to FIG. 5, in one embodiment of the present invention, a license condition may be selected upon installing each new instance of a software product. The license condition may be automatically or manually selected from those that may be applied to the software product. These conditions may be displayed as a list 507 for the product "PRO" (i.e., "Ls1," "Ls2," "Lb1," and "Lb2"). The selected license condition may then be assigned to the new instance.

In this case, for example, the license conditions "Ls1," "Ls2," "Lb1," and "Lb2" may be assigned to the instances "MyPROa," "MyPROb," "MyPROc," and "MyPROd," respectively. This reconciliation information 508 may then be used to associate each discovered instance with the corresponding license condition. Particularly, it may be determined that the discovered instances "MyPROa," "MyPROb," "MyPROc," and "MyPROd" have been installed under the license conditions "Ls1," "Ls2," "Lb1," and "Lb2," respectively.

It should be noted that discovery of the software products actually installed on the system may be necessary, since it is not possible to ensure that the reconciliation information 508 lists all instances of the software products actually installed on the system. Indeed, some software products may not implement embodiments of the invention (such as when they are delivered under a single license condition), and some instances may have been installed without being assigned to the corresponding license conditions (because of a runtime error, for example).

The discovered information 510, including the assigned license conditions, may be compared to the available licenses 405 to verify proper system compliance, as indicated by a happiness emoticon in the figure. In the present example, it may be established that the available licenses "Ls1," "Ls2," Lb1," and "Lb2" actually authorize installation of the instances "MyPROa" ("MyLs1"), "MyPROb" ("MyLs2"), "MyPROc" ("MyLb1"), and "MyPROd" ("MyLb2"), respectively.

Embodiments of the invention thus facilitate monitoring usage of the software products in any situation, even when multiple license conditions may apply to certain products. This may impart a beneficial impact on the accuracy of the process by correctly accounting for and reliably detecting non-compliance situations for the installed software products.

Figure 6:
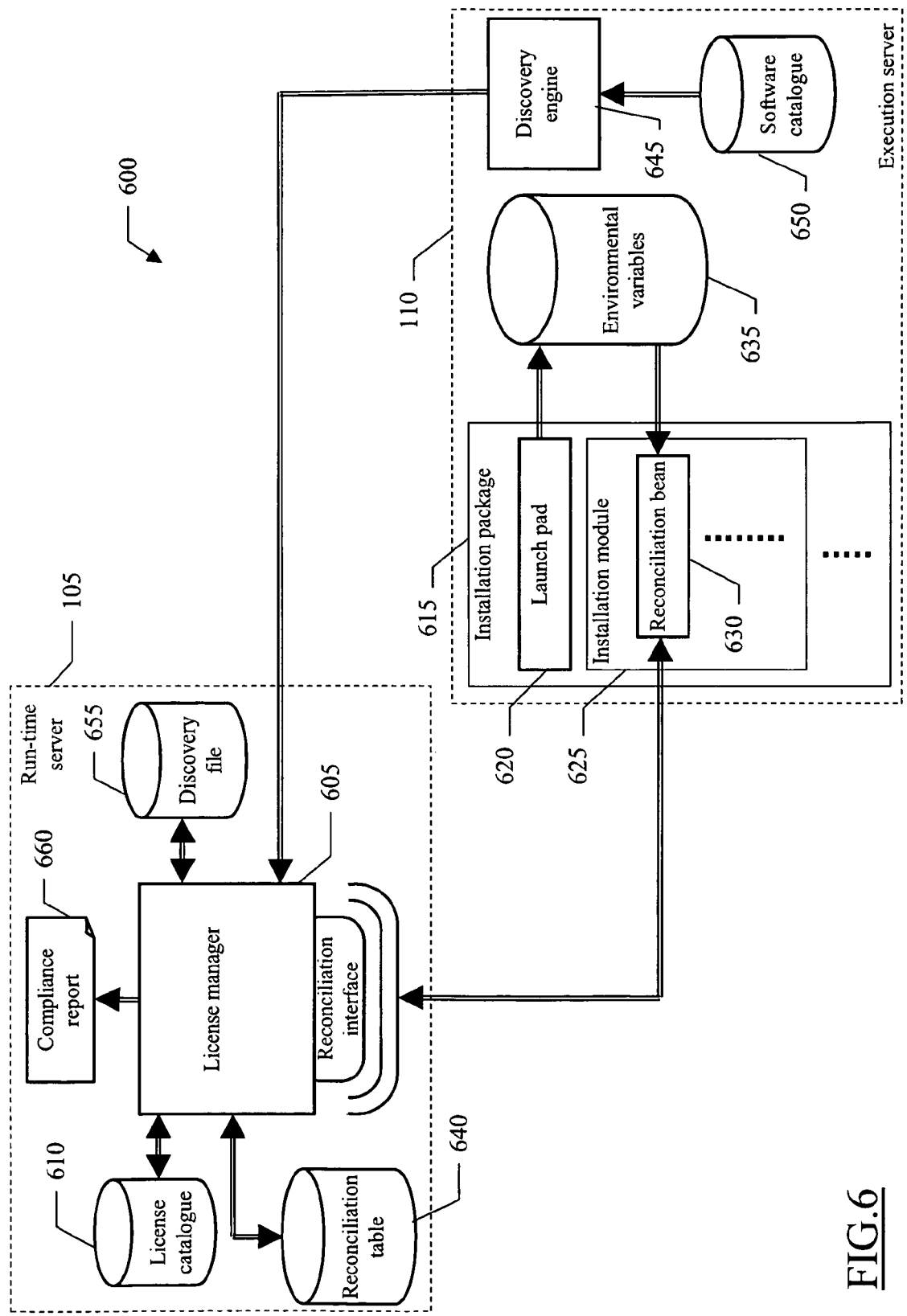
FIG. 6 depicts the main software components that may be used to implement embodiments of the invention.

With reference now to FIG. 6, the main software components that may be used to implement the above-described embodiments are denoted as a whole with the reference 600. The information (programs and data) may be stored on the hard disk, and loaded at least partially into the working memory of each computer when the programs are running, together with an operating system and other application programs. The programs may be initially installed onto the hard disk from a DVD-ROM, for example.

Considering in particular the runtime server 105 of a generic division, a license manager 605 may control the monitoring of software products installed on all the execution servers 110 of the division. For this purpose, the license manager 605 may access a license catalogue 610 that is downloaded from the administration server periodically, or at any change thereof. The license catalogue 610 may store information about licenses that have been acquired for the division. For each available license, the license catalogue 610 may include an indication of the software product to which it applies (such as its product name), and the corresponding license condition, identified by a corresponding label.

An installation package 615 may be provided for each single software product or software bundle (i.e., multiple software products) to be installed on a specific execution server 110. The installation package 615 may include a launch pad 620 stored, for example, on a main DVD-ROM. The launch pad 620 may be used to run the installation package 615, and to control installation of the corresponding software products. Generally, the launch pad 620 may display a series of panels, used to define specific characteristics of installation at runtime. Alternatively, the launch pad 620 may be invoked in a console mode (when no graphical interface is available), or in silent mode (without displaying any panel, and using paramonitors that are defined by default or read from a response file). The launch pad 620 may be defined by a series of Java beans, or simply beans, for actions to be executed and panels to be displayed. Each bean may consist of a reusable software component that complies with a preset specification.

The installation package 615 may include an installation module 625 for each software product. The installation module 625 may control installation of the corresponding software product. In some embodiments, for example, the installation module 625 may control installation via a series of beans for actions to be executed and panels to be displayed.

In one embodiment of the present invention, the installation module 625 of each software product may include an additional reconciliation bean 630, which may be invoked at installation. The reconciliation bean 630 may access a reconciliation interface exposed by the license manager 605 to download a list of the license conditions that may be applied to the software product. As previously mentioned, the license conditions may be extracted from a license catalogue 610.

The reconciliation bean 630 may assign the new instance of the software product being installed to the corresponding license condition. This process may be manual, such that the desired license condition may be directly selected from a corresponding panel. In addition or in the alternative, the process may be automatic. For example, the reconciliation bean 630 may infer the license condition of the new instance according to information extracted from a repository 635 of environmental variables, such as a configuration file of the operating system. The environmental variables may include key/value pairs, which may be used to store information about the execution server 110, such as its identifier (host name), model type, and the like.

In some embodiments, an indication of the license condition that should be applied to each software product of the installation package 615 may be stored by the launch pad 620 in a dedicated environmental variable. In this way, the installation module 625 may be used to install the software product under any license condition that may be applied thereto. It may therefore be possible to ship a single version of the software product to simplify its management.

The reconciliation bean 630 may return the reconciliation information to the license manager 605, which may log such information into a reconciliation table 640. For each instance of a software product to which multiple license conditions may be applied, the reconciliation table 640 may include an identifier of the instance, and the label of the assigned license condition. Typically, the instance may be identified by the product name (of the software product) and the host name (of the execution server where it is installed). Alternatively, a unique instance name may be used, such as based on a corresponding installation path. This mode of identification may be helpful, for example, when more instances of the same software product may be installed on a single execution server.

Similar considerations may apply when a software product is removed from the execution server 110.

The execution server 110 may also include a discovery engine 645, such as the above-mentioned "CIT." The discovery engine 645 may scan a file system of the execution server 110 to identify any instances of the software products installed thereon. The discovery engine 645 may leverage a software catalogue 650 that is downloaded from the runtime server 105 periodically, or at any change thereof.

For each software product to be monitored, the software catalogue 650 may include a signature indicating installation of the software product. Typically, the signature consists of the specification of a file (defined by multiple attributes, such as its name, size and checksum), which uniquely identifies the software product. The discovery engine 645 may return the discovery information to the license manager 605, which may log it into a discovery file 655. The discovery file 655 may list all the instances of the software products installed on the system. Each instance may be identified by its product name and host name, for example.

The license manager 605 may update the discovery file 655 by associating each instance (of the software products delivered under multiple license conditions) with the corresponding license condition, as indicated in the reconciliation table 640. The license manager 605 may compare the discovery file 655 with the license catalogue 610. A compliance report 660 may then be generated that indicates any discrepancy between the discovered instances and the available licenses. The compliance report 660 may then be returned to the administration server.

Figure 7A:
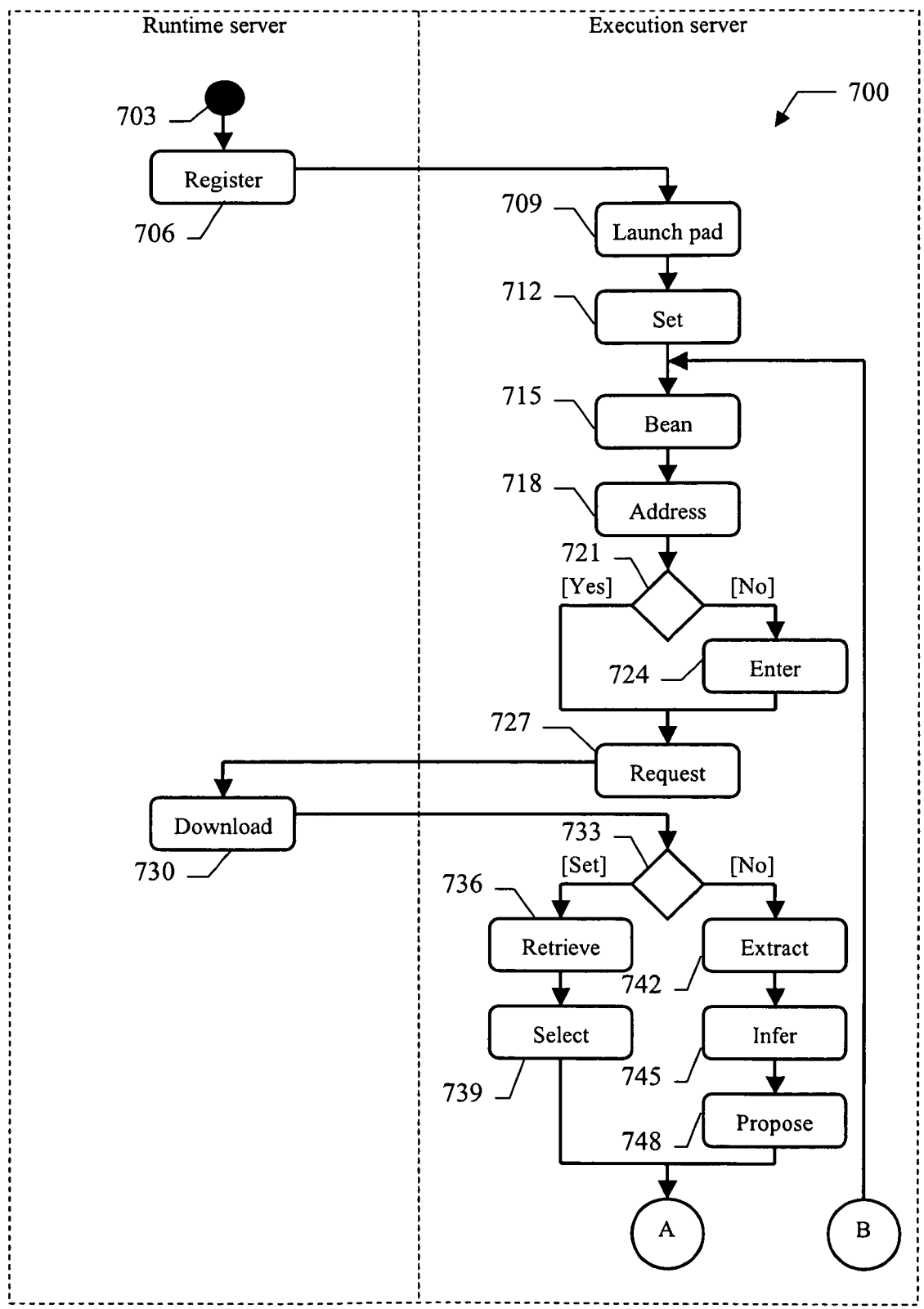
FIG. 7 is a diagram illustrating a flow of activities relating to one embodiment of the invention.
Figure 7B:
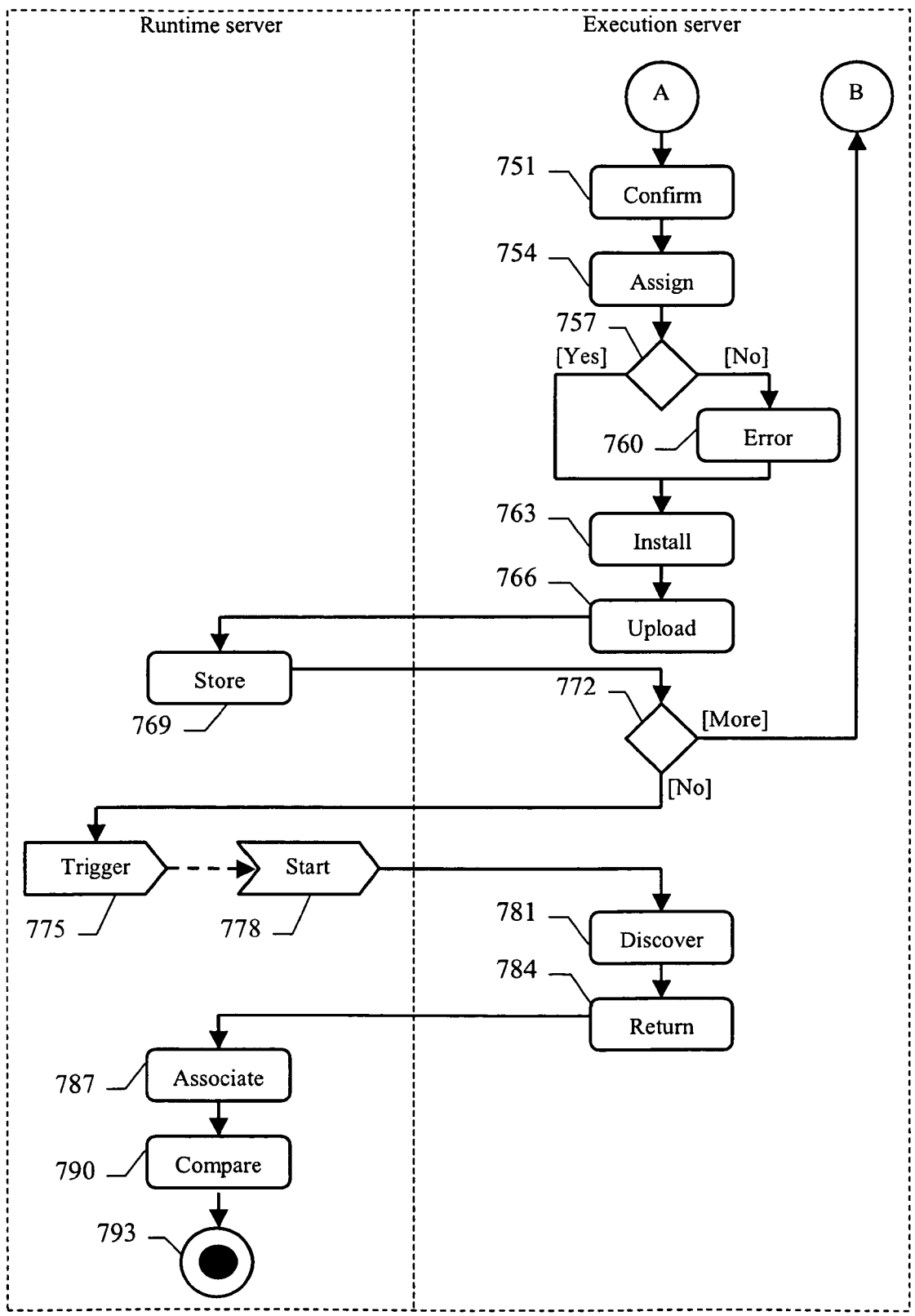

Referring now to FIGS. 7A-7B, the logic flow of an exemplary process 700 that may be implemented to monitor the usage of software products is represented.

The method may begin 703 in the swim-lane of the runtime server of a generic division. When a new software product/bundle is acquired, each corresponding license (for the single software product or for the software bundle and its software products) may be registered at block 706 by an administrator of the system. This result may be achieved either manually or automatically (when the software product is provided with an electronic license in machine-readable form, such based on the XML specification). The installation package of the software product/bundle may then be passed to an operator for installation on the desired execution server(s).

When the installation package is run on a generic execution server, the corresponding launch pad may be invoked 709. In response thereto, the launch pad may set 712 an environmental variable for each software product to be installed that indicates a corresponding license condition.

A loop may then be executed for each software product of the installation package. The loop may begin where the corresponding reconciliation bean is invoked 715. Continuing to block 718, the reconciliation bean may attempt to determine a network address of the runtime server (for example, according to a standard naming convention). If the address of the runtime server is not found (decision block 721), a panel may be displayed at block 724 to prompt the operator to enter it manually. The flow of activity may then descend into block 727. The same point may also be reached from block 721 directly when the address of the runtime server has been determined automatically.

In any case, assuming that the runtime server has been found, the reconciliation bean may submit a request to the runtime server for a list of the license conditions that may be applied to the software product. In response, the runtime server may retrieve 730 the required information from the license catalogue and download it to the execution server.

Returning to the swim-lane of the execution server, the flow of activity may branch at block 733. Particularly, if a dedicated environmental variable has been set (by the launch pad) with an indication of the license condition to be applied to the software product, blocks 736-739 may be executed. Otherwise, blocks 742-748 may be executed. In either case, the method may merge again at block 751.

Considering now block 736, the indication of the license condition under which the software product is being installed may be extracted from the corresponding environmental variable. Continuing to block 739, this license condition may then be identified in the list of the applicable license conditions (if it is present), and selected therefrom. In some cases, selection of the license condition to be assigned to the new instance of the software product may also be completely automated.

With reference now to block 742, the reconciliation bean may extract information from environmental variables that may facilitate determining under which license condition the software product is being installed. Such information may include, for example, other software products installed on the execution server, their types and/or users, and the like. Continuing to block 745, the reconciliation bean may attempt to infer under which license condition the product is being installed according to the retrieved information. For example, it may be assumed that the software product is installed in a software bundle when it is a prerequisite for one or more other software products that are present on the execution server. The inferred license may be proposed for selection at block 748. This feature may provide some sort of automation, even where the software product is delivered in installation packages that do not implement embodiments of the invention.

Moving now to block 751 (either from block 739 or from block 748), a panel listing all applicable license conditions may be displayed. The proposed license condition may be highlighted to prompt the operator for confirmation. The operator may then select, at block 754, the license condition to be assigned to the new instance of the software product. This may generally occur by the operator confirming the proposed license condition. Of course, this step may be omitted in a completely automated implementation (for example, where the launch pad runs in the silent mode).

A test at block 757 may determine whether a license condition has been assigned to the new instance. If not, an error status may be entered at block 760. The error status may simply generate a warning to the operator with no effect on the installation procedure. The software product may thus be installed in a temporarily floating state, without any assigned license (such as before registration of the corresponding license). Alternatively, the procedure may be aborted to prevent installation of the software product. This feature may be implemented, for example, when very strict compliance requirements apply.

Conversely, (i.e., when a license has been assigned to the new instance), the method may continue from block 757 to block 763. This same point may also be reached from block 760 when the installation process is allowed to continue despite an error. In this phase, installation of the software product may continue as usual. Once the process has been successfully completed, the corresponding reconciliation information (listing the license condition for the new instance) may be uploaded to the runtime server at block 766. In response, the runtime server may add the received information to the reconciliation table at block 769.

Returning to the swim-lane of the execution server, a test at block 772 may determine whether further software products require installation. If so, the method may return to block 715 to repeat the above-described operations for a next software product of the installation package.

If no further software products require installation, the flow of activity may descend into block 775. Upon occurrence of a triggering event, (for example, the expiration of a predefined time-out or the submission of an explicit command), the runtime server at block 778 may enforce the start of a discovery process on every execution server. In response, all the instances of software products actually installed on a generic execution server may be discovered at block 781. The discovery information may be returned at block 784 to the runtime server.

With reference now to block 787, the runtime server may add the received information to the discovery table, and may update it by associating each discovered instance with the corresponding license condition, as indicated in the reconciliation table. Continuing to block 790, the discovery information may then be compared with the available licenses to generate a corresponding compliance report. The method may end at the concentric white/black circles 793.

Naturally, in order to satisfy local and specific requirements, a person skilled in the art may apply to the solution described above many logical and/or physical modifications and alterations. More specifically, although the present invention has been described with a certain degree of particularity with reference to various embodiments thereof, it should be understood that various omissions, substitutions and changes in the form and details as well as other embodiments may be possible. Particularly, embodiments of the invention may even be practiced without the specific details set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, embodiments of the invention may be implemented with an equivalent method by using similar steps, removing some steps being non-essential, or adding further optional steps. Moreover, the steps may be performed in a different order, concurrently or in an interleaved way, in whole or in part.

It should be readily apparent that the term "software product" as used herein may refer to computer programs, video and/or audio contents, electronic books, or any other digitally encoded manufactures and parts thereof. Likewise, the above-mentioned "license conditions" are merely illustrative. For example, the software products may be delivered under license conditions that authorize their installation with capacity limits (defined by cost units based on a processing power of the execution servers where they are installed), with location constraints, or under any other usage conditions in the broadest meaning of the term (even without any direct connection with actual licenses). Moreover, embodiments of the invention are not restricted to any specific discovery tool or technique for detecting the instances of the software products that are actually installed on the system. In one embodiment, for example, it may be possible to exploit signatures based on configuration variables or on logical expressions combining multiple parameters.

Alternatively, the reconciliation bean may be replaced with an equivalent module (even written in another language). However, nothing prevents delivering different versions of the same software product for its installation under corresponding license conditions.

Similar considerations may apply if more complex algorithms - based on environmental information relating to the execution server—is used to infer the license condition under which each software product may be installed (for example, according to its installation path, co-location with other software products, network relations with other execution servers, and the like).

Moreover, the launch pad may provide the information about the license condition under which each software product of the installation package may be installed in a different way (for example, by passing it directly in a parameter at the invocation of the corresponding reconciliation bean).

Alternatively, the list of the license conditions that may be applied to each software product (to be displayed to the operator) may be downloaded from a web site of the software product. The possibility of embedding this list directly in the installation package, however, is not excluded.

In any case, embodiments of the invention may be implemented even in a completely automatic way (with the license condition that is selected by the launch pad without any confirmation), or in a completely manual way (with the license condition that is selected by the operator without any proposal).

As pointed out above, the feature of preventing installation of the software product when no license condition may be assigned to its new instance in not strictly necessary. For example, in this case it may also be possible to assign the new instance automatically to the broadest license condition among those applicable to the software product.

It should be readily apparent that the same solution may also be applied to software products that are delivered only in the stand-alone mode (such as under standard, free, or limited license conditions), only in bundle modes (within different software bundles), or in a combination thereof.

Embodiments of the invention are not limited to any specific license management application. Particularly, the available information may be used to monitor the usage of the software products in the broadest meaning of the term, including their installation only as described above, their running (even with the possibility of preventing the launching of software products that are not authorized), and the like.

More generally, embodiments of the invention may be used in different environments, such as for monitoring applications.

Embodiments of the invention may be implemented as stand-alone modules, as plug-ins for the license management application, or even directly embedded in the license management application or the discovery tool. It should be readily apparent that it is also possible to deploy the same solution as a service that is accessed through a network (such as the Internet). Similar considerations apply if the program (which may be used to implement each embodiment of the invention) is structured in a different way, or if additional modules or functions are provided. Likewise, the memory structures may be of other types, or may be replaced with equivalent entities, not necessarily consisting of physical storage media. In any case, the program may take any form suitable to be used by any data processing system or in connection therewith (for example, within a virtual machine. Particularly, the program may be in the form of external or resident software, firmware, or microcode (either in object code or in source code, for example, to be compiled or interpreted.

Embodiments of a program in accordance with the invention may also be provided on any computer-usable medium. The medium may be any element suitable to contain, store, communicate, propagate, or transfer the program. For example, the medium may be of the electronic, magnetic, optical, electromagnetic, infrared, or semiconductor type. Examples of such medium may include fixed disks (where the program can be pre-loaded), removable disks, tapes, cards, wires, fibers, wireless connections, networks, broadcast waves, and the like. In any case, an embodiment of the present invention may be implemented with a hardware structure (for example, integrated in a chip of semiconductor material), or with a combination of software and hardware.

Embodiments of a method in accordance with the invention may also be carried out on a system with a different architecture or including equivalent units. For example, the runtime servers and the administration server may be collapsed into a single control server for all the execution servers (or any equivalent target computer). It is also possible to have all the computers in the same location (for example, connected through a LAN). Each computer may have another structure or may include similar elements, such as cache memories temporarily storing the programs or parts thereof. In any case, it is possible to replace the computer with any code execution entity such as a PDA, a mobile phone, or the like, or with a combination thereof, such as a multi-tier architecture, a grid computing infrastructure, or the like.

The invention claimed is:

1. A method for monitoring software product usage in a data processing system, the method comprising:
    installing an instance of a software product on a target entity of a data processing system;
    identifying, by at least one processor, a license condition that is applicable to the instance, wherein identifying the license condition comprises retrieving environmental information of the target entity and inferring the license condition applicable to the instance based on the environmental information, wherein inferring the license condition comprises at least one of (1) inferring a bundle license condition for the instance based on presence of at least one other software product on the target entity and (2) inferring the license condition based on an installation path of the instance;
    generating reconciliation information that specifically identifies the license condition that is applicable to the instance; and communicating the reconciliation information to a license manager configured to monitor software products installed on the target entity.

2. The method of claim 1, further comprising downloading, to the target entity, a list of license conditions that are potentially applicable to the instance.

3. The method of claim 1, further comprising scanning the target entity to discover the instance installed on the target entity.

4. The method of claim 3, further comprising analyzing the reconciliation information to identify the license condition associated with the discovered instance.

5. The method of claim 2, wherein downloading comprises downloading upon installing the software product.

6. The method of claim 1, wherein the license condition comprises at least one of a license condition for using the software product in stand-alone mode, and a license condition for using the software product in bundle mode.

7. The method of claim 4, further comprising verifying compliance of the discovered instance with the license condition.

8. A computer program product for monitoring usage of software products on a data processing system, the computer program product comprising:
a non-transitory computer-readable storage medium storing computer instructions which when executed by at least one computer cause the at least one computer to collectively perform the following:
install an instance of a software product on a target entity of a data processing system;
identify a license condition that is applicable to the instance, wherein identifying the license condition comprises retrieving environmental information of the target entity and inferring the license condition applicable to the instance based on the environmental information, wherein inferring the license condition comprises at least one of (1) inferring a bundle license condition for the instance based on presence of at least one other software product on the target entity and (2) inferring the license condition based on an installation path of the instance;
generate reconciliation information that specifically identifies the license condition that is applicable to the instance; and
communicate the reconciliation information to a license manager configured to monitor software products installed on the target entity.

9. The computer program product of claim 8, wherein the computer instruction further cause the at least one computer to download, to the target entity, a list of license conditions that are potentially applicable to the instance.

10. The computer program product of claim 8, wherein the computer instruction further cause the at least one computer to scan the target entity to discover the instance installed on the target entity.

11. The computer program product of claim 10, wherein the computer instruction further cause the at least one computer to analyze the reconciliation information to identify the license condition associated with the discovered instance.

12. The computer program product of claim 9, wherein downloading comprises downloading upon installing the software product.

13. The computer program product of claim 8, wherein the license condition comprises at least one of a license condition for using the software product in stand-alone mode, and a license condition for using the software product in bundle mode.

14. The computer program product of claim 11, wherein the computer instructions further cause the at least one computer to verify compliance of the discovered instance with the license condition.

15. A system for monitoring software product usage in a data processing system, the system comprising:
at least one processor;
at least one memory device coupled to the at least one processor and storing computer instructions for execution on the at least one processor, the computer instructions causing the at least one processor to:
install an instance of a software product on a target entity of a data processing system;
select a license condition that is applicable to the instance, wherein selecting the license condition comprises retrieving environmental information of the target entity and inferring the license condition applicable to the instance based on the environmental information, wherein inferring the license condition comprises at least one of (1) inferring a bundle license condition for the instance based on presence of at least one other software product on the target entity and (2) inferring the license condition based on an installation path of the instance;
generate reconciliation information that specifically identifies the license condition that is applicable to the instance; and
communicate the reconciliation information to a license manager configured to monitor software products installed on the target entity.

* * * * *